United States Patent [19]

Furuhata et al.

[11] Patent Number: 4,772,950
[45] Date of Patent: Sep. 20, 1988

[54] METHOD AND APPARATUS FOR SAMPLING AND PROCESSING A VIDEO SIGNAL

[75] Inventors: Takashi Furuhata; Hitoaki Owashi; Michio Hibi, all of Yokohama, Japan

[73] Assignee: Hitachi, Ltd., Tokyo, Japan

[21] Appl. No.: 658,021

[22] Filed: Oct. 5, 1984

[30] Foreign Application Priority Data

Oct. 14, 1983 [JP] Japan ............................... 58-190761
Jun. 26, 1984 [JP] Japan ............................... 59-131699

[51] Int. Cl.⁴ ........................ H04N 5/04; H04N 5/14
[52] U.S. Cl. ................................. 358/148; 358/158; 358/160; 358/320; 358/337; 360/36.1
[58] Field of Search ............... 358/148, 149, 158, 319, 358/31, 320, 337, 339, 17, 18, 19, 160; 360/36.1

[56] References Cited

U.S. PATENT DOCUMENTS

| | | | |
|---|---|---|---|
| 3,860,952 | 1/1975 | Tallent | 358/8 |
| 3,971,063 | 7/1976 | Michael et al. | 358/339 |
| 3,978,519 | 8/1976 | Stalley et al. | 358/326 |
| 4,065,787 | 12/1977 | Owen | 358/160 |
| 4,165,524 | 8/1979 | Ninomiya | 358/148 |
| 4,438,456 | 3/1984 | Yoshinaka | 358/148 |
| 4,561,012 | 12/1985 | Acampora | 358/31 |

*Primary Examiner*—James J. Groody
*Assistant Examiner*—Michael D. Parker
*Attorney, Agent, or Firm*—Antonelli, Terry & Wands

[57] ABSTRACT

A method and apparatus for sampling and processing a video signal having a time base fluctuation with sampling clock pulses produced from an oscillator which is instantaneously phase-synchronized with synchronizing information of the video signal. The synchronizing information is separated from the video signal by a separator and the oscillator is controlled to at least one of start and stop oscillation in accordance with the synchronizing information.

26 Claims, 8 Drawing Sheets

METHOD AND APPARATUS FOR SAMPLING AND PROCESSING A VIDEO SIGNAL

BACKGROUND OF THE INVENTION

This invention relates to a method and apparatus for sampling, quantizing and processing a video signal, especially a method and apparatus for minimizing deterioration of picture quality accompanied with quantization.

There are many types of known apparatus for processing a video signal. For example, an apparatus for converting the video signal into a digital signal; an apparatus for memorizing the video signal of one field or one frame and processing the same; an apparatus for filtering the video signal or compensating the signal by use of a line memory; an apparatus for eliminating a time base fluctuation of the video signal by a buffer memory; an apparatus for time-compressing the video signal and transmitting the signal in a time-division multiplex system; an apparatus for band-compressing a highly defined video signal and transmitting the signal in the time-division multiplex system; etc. In all such known apparatus, it is necessary to sample and quantize the video signal by using sampling clock pulses with sequential processing at each sample value.

In order to produce the sampling clock pulses, the most simple known method utilizes asynchronous and independent pulses. However, such method causes some problems in the aforementioned apparatus. For example, in the apparatus using the buffer memory, time base fluctuations generate in a processed video signal according to quantizing errors on the time base due to asynchronism between the video signal and the sampling clock pulses, and in an apparatus for time-compressing and expanding the video signal, the quantizing errors are magnified so that the quality of a picture reproduced from the processed video signal is degraded. Further, since the video signal is a broad band signal, it is necessary to provide a sufficiently high sampling clock pulse frequency, but such frequency cannot be obtained due to a limit of the working speed of the apparatus. Therefore, the sampling clock frequency approaches the video signal band so that spurious components are generated. As the spurious components appear as moiré noise in a reproduced picture, it is necessary to restrict the video signal band sufficiently and rapidly before processing the video signal. However, the rapid restriction of the band gives rise to a delay distortion and as a result, a waveform distortion, for example, a ringing is generated.

Another method, which uses an automatic frequency controlled circuit (hereinafter AFC circuit) as shown in FIG. 1, is well known for producing the sampling clock pulses. Referring to FIG. 1, the numerals 1 and 2 denote an input terminal of the video signal and an output terminal of the sampling clock pulses, respectively. A horizontal synchronizing signal is separated from the input video signal by a horizontal synchronous signal separator 3 and supplied to one input terminal of a phase comparator 4. The output of the phase comparator is supplied to a voltage controlled oscillator 6 (hereinafter VCO) via a phase compensator 5. An output signal of the VCO is divided by a divider 7 which produces an output signal having the same frequency as a horizontal scanning frequency of the input video signal for phase comparison with the horizontal synchronizing signal by the phase comparator 4. An error voltage output signal is supplied in response to a phase difference of the both signals to the VCO 6 as a control voltage therefor. The AFC circuit, which is constructed as described above, supplies the sampling clock pulses synchronized with the input video signal from the output terminal 2. As this prior method is based upon a feedback control, it also presents some problems. For example, a phase fluctuation of the sampling clock pulses remains due to circuit disturbance. If the dividing ratio of the divider 7 becomes large, a phase distance between the sampling clock pulses and the horizontal synchronizing signal becomes large, so that the remainder of the phase fluctuation also becomes large. Further, if the input video signal has a time base fluctuation, the AFC circuit generates a follow-up error. If the response speed of the AFC circuit is increased in order to enhance the follow-up ability thereof, the AFC circuit then also has a high response to noise contained in the input video signal. As a result, the AFC circuit becomes unstable. Also, if the time base fluctuation of the input video signal becomes large, the AFC circuit deviates from the synchronous range, so that it becomes inoperative.

SUMMARY OF THE INVENTION

Accordingly, it is an object of the present invention to provide a method and apparatus for producing a video signal which enables suppression of the deterioration of the picture quality due to the quantization of the video signal on a time base.

It is another object of the present invention to provide a method and apparatus for eliminating the time base fluctuation of the video signal.

Briefly, to attain the above-mentioned objects, according to the present invention, the sampling clock pulses are produced from an oscillating output signal of an oscillator which is instantaneously phase-synchronized with synchronizing information of the input video signal. Further, according to a feature of the present invention, during a vertical blanking period, the oscillating frequency of the oscillator is stabilized by a feedback loop comprising a phase comparator, which phase compares the oscillating output signal or a divided signal proportional thereto with a reference signal having a constant frequency or a divided signal proportional thereto, and the oscillation in the form of a VCO has the oscillating frequency thereof controlled in response to a phase error signal from the phase comparator.

DETAILED DESCRIPTION OF THE PREFERRED EMBODIMENTS

Figure 1:
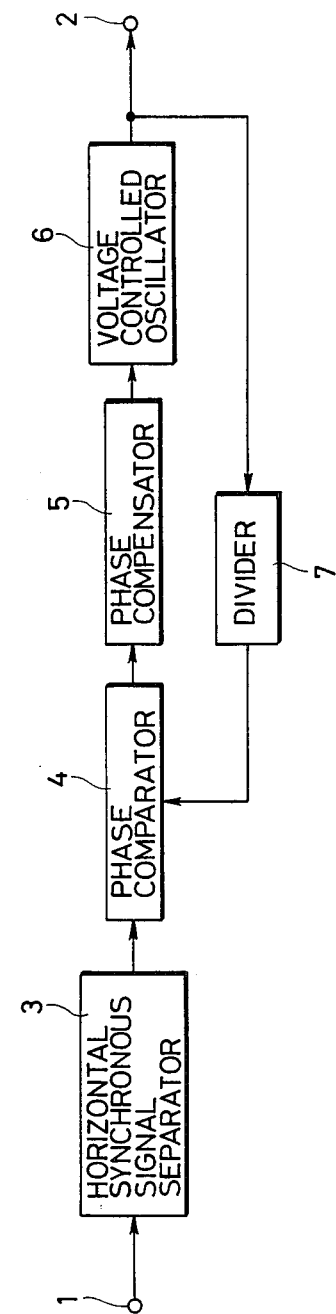
FIG. 1 is a block diagram representation of an AFC circuit for producing a sampling clock pulse according to the prior art.
Figure 2:
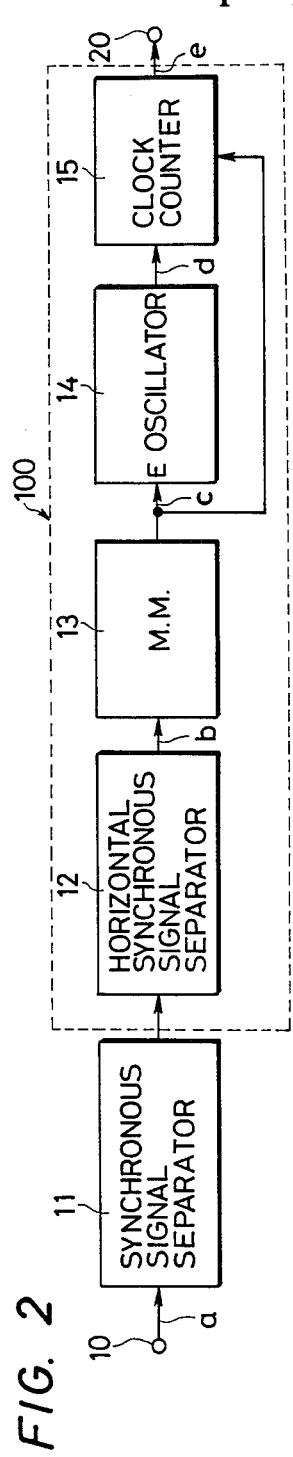
FIG. 2 is a block diagram representation of an apparatus for producing a sampling clock pulse according to an embodiment of the present invention.

Referring to FIG. 2, the numerals 10 and 20 denote an input terminal of a video signal and an output terminal of a sampling clock pulse, respectively. A synchronous signal separator 11 separates a synchronizing signal from the input video signal, which is shown as a waveform (a) in FIG. 3 and contains the synchronizing signal S, and supplies the same to synchronous signal separator 12 forming a part of a sampling clock generator 100. The horizontal synchronous signal separator 12 separates a synchronizing signal related to a horizontal scanning line from an output signal of the separator 11 and provides an output as shown in waveform (b) in FIG. 3 to a monostable multivibrator 13 (hereinafter M.M.). M.M. 13 is triggered by an output signal of the separator 12 and supplies a start pulse having a fixed width $\tau$, as shown in waveform (c) in FIG. 3 to an oscillator 14. The oscillator 14 starts and stops oscillation in response to the start pulse from the M.M. 13, the oscillator 14 being constructed, for example, by an IC of an M.M. type oscillator having an enable terminal E, such as SN74S124N produced by Texas Instruments, Inc. As apparent from a waveform (d) in FIG. 3, the output signal of the oscillator is low (hereinafter "L") when the start pulse supplied to the enable terminal E is high (hereinafter "H"), and sequential oscillating output pulses are provided when the start pulse is "L".

Figure 3:
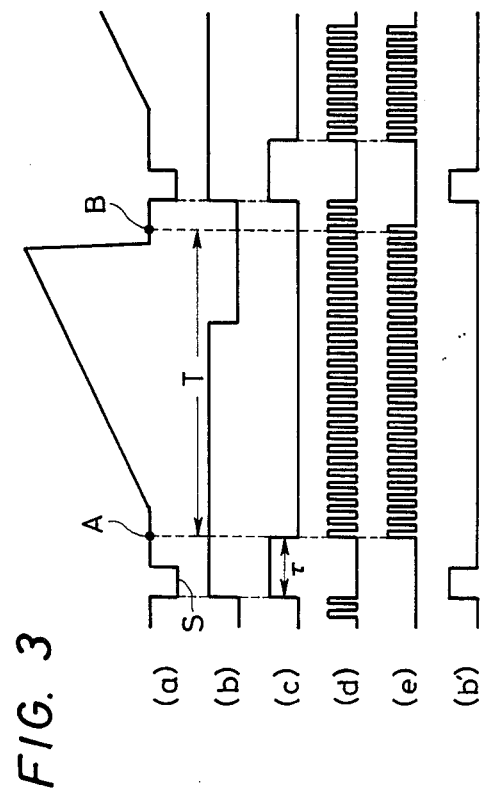
FIG. 3 illustrates waveforms of signals in accordance with FIG. 2.

The output signal of the oscillator 14 is supplied to a clock counter 15, which initiates counting of the oscillating output pulses in response to the start pulse from M.M. 13 and outputs each pulses during a constant period T as shown in waveform (e) in FIG. 3. The output signal thereof is delivered to the output terminal 20 as a sampling clock pulse. The width $\tau$ of the start pulse and the period T are appropriately determined so that a start point and a final point of the sampling clock pulses, which are shown as points A and B of the waveform (a), respectively, are located within a horizontal blanking period of the input video signal. Therefore, a sampling clock pulse, which is necessary and sufficient for processing of the input video signal is generated.

Further, as is apparent from the above-mentioned explanation, since the sampling clock pulse generated in instantaneously phase-synchronized with the synchronizing signal of the input video signal, no time base fluctuation due to sampling quantization results and the sampling clock pulses can be obtained without influence of time base fluctuations. Further, the phase of the sampling clock pulse is set each horizontal scanning line. Therefore, even if spurious components due to the sampling frequency are generated, resulting in moiré noise, since the phase of the sampling clock pulses is set for every horizontal scanning line, the interruption of the spurious components is visually reduced. Meanwhile, it is possible that instead of the synchronizing signal (b), another synchronizing signal, which has the same phase as the synchronizing signal S as shown in waveform (b') in FIG. 3, is utilized. In such case, the M.M. 13 is omitted and the output signal of the separator 12 is directly supplied to the oscillator 14 and the clock counter 15.

Figure 4:
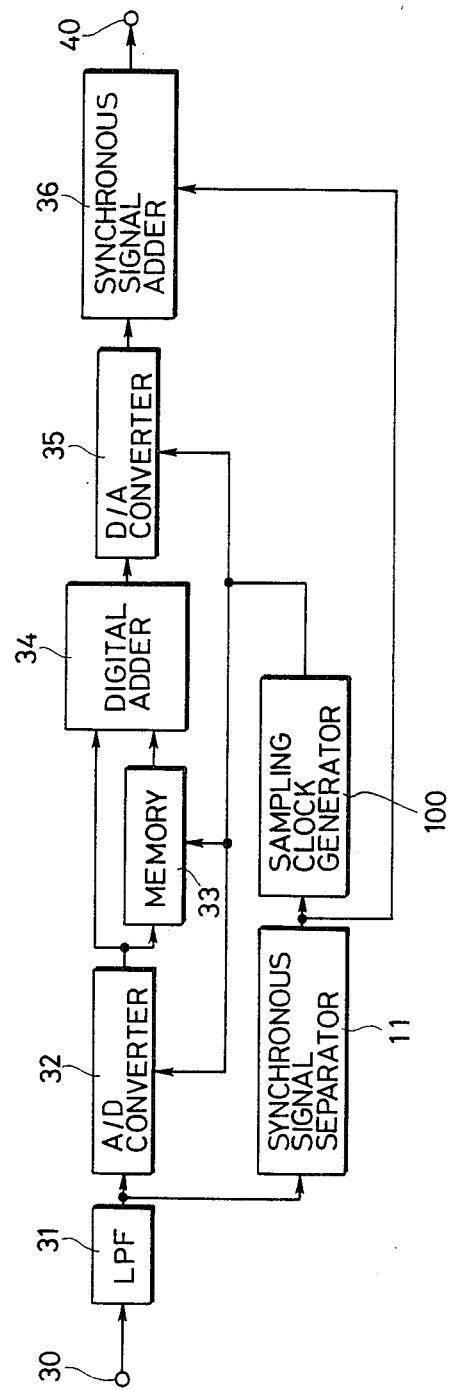
FIG. 4 is a block diagram representation of an apparatus for processing a video signal as a comb-filter according to an embodiment of the present invention.

Next, a digital type comb-filter using the sampling clock generator described above will be described. Referring to FIG. 4, the numerals 30 and 40 denote an input terminal of the video signal and an output terminal of a comb filter processed video signal, respectively. The numeral 100 denotes the sampling clock generator described above. A low pass filter 31 (hereinafter, LPF), restricts a band of the input video signal applied to the input terminal 30 in order to suppress generation of spurious components. An output signal of the LPF 31 is converted to a digital signal by an analog to digital (hereinafter A/D) converter 32. Further, the output signal of the LPF 31 is supplied to the separator 11 so that the synchronizing signal is separated. By using the synchronizing signal, the sampling clock generator 100 outputs the sampling clock pulses as described above. A line memory 33 constructed, for example, by a shift register has the output signal of the A/D converter 32 sequentially stored thereby and read by using the sampling clock pulse. The capacity of the line memory 33 is determined to be the same as the digitalized video signal corresponding to the period T shown in FIG. 3. Further, as the generator 100 generates the sampling clock pulse during the period T from the same start point A every horizontal scanning line, an output signal surely delayed one horizontal scanning period can be obtained from the line memory 33, even if the input video signal has a time base fluctuation.

The delayed output signal from the line memory 33 and the output signal of the A/D converter 32 are added by a digital adder 34, an output signal of which is converted to an analog signal by a digital to analog (hereinafter D/A) converter 35. As the sampling clock pulse from the generator 100 is not generated except during the period T, that is, during the horizontal blanking period, the output signal of the D/A converter 35 does not contain a horizontal blanking signal and a horizontal synchronizing signal. Therefore, a synchronous signal adder 36 adds the synchronizing signal from the separator 11 to the output signal of the D/A converter 35, so that a proper video signal processed by a comb filter is delivered to the output terminal 40. The comb filter of this embodiment reduces the spurious interruption sharply. As a result, it becomes possible to reduce a cut-off characteristic of the LPF 31, so that a waveform distortion of the video signal due to a delay distortion of the LPF 31 can be reduced.

Figure 5:
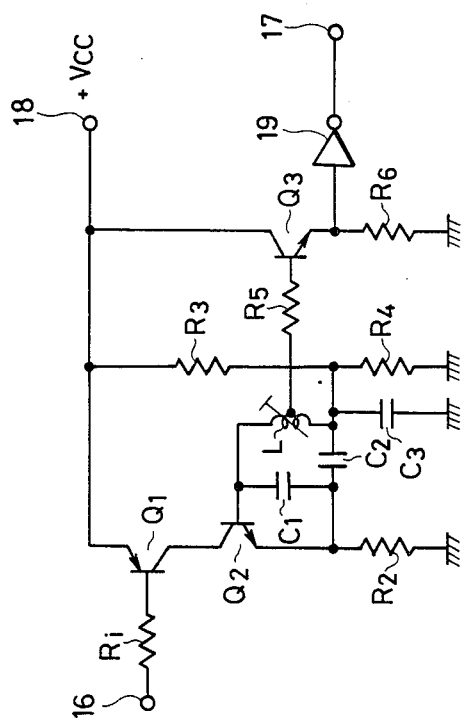
FIG. 5 is a circuit diagram of an oscillator in accordance with FIG. 2.

FIG. 5 is a circuit diagram of an oscillator 14 of the generator 100 of FIG. 2. Referring to FIG. 5, the numerals 16, 17, 18 and 19 denote an input terminal, an output terminal, a power source terminal and an inverter, respectively. A Colpitts oscillator is formed by a transistor $Q_2$, condensers $C_1$ and $C_2$, and an inductance L. As the start pulse from the M.M. 13 shown in FIG. 2 is supplied to the input terminal 16, the transistor $Q_1$ becomes nonconductive or "OFF" in the case that the start pulse is "H" and stops an oscillation. In response to the transition from "H" to "L" of the start pulse, the transistor $Q_1$ becomes conductive or "ON", so that the oscillator starts to oscillate and an oscillating output signal is obtained from a transistor $Q_3$ during a "L" period of the start pulse. An output signal of the transistor $Q_3$ is delivered through the inverter 19, which is used to shape the output signal, to the output terminal 17, and supplied to the clock counter 15 shown in FIG. 2.

Figure 6:
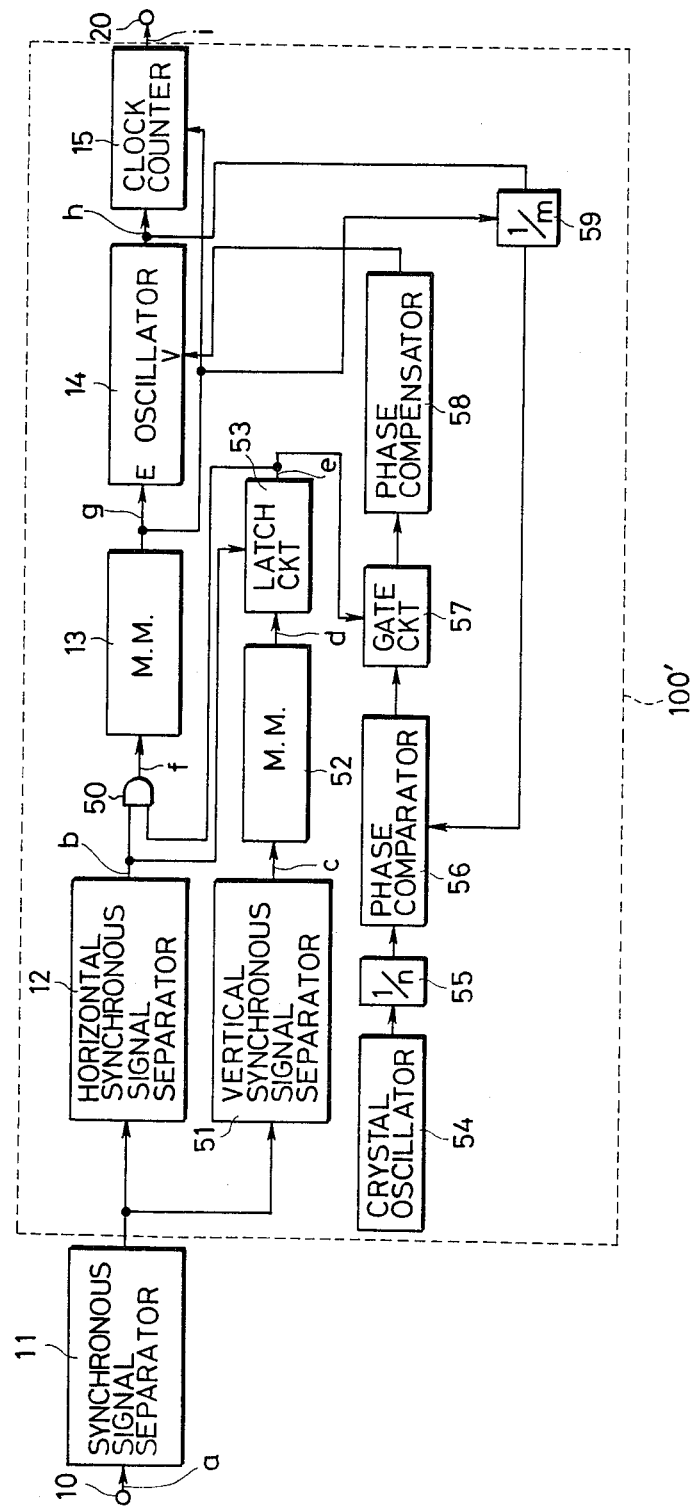
FIG. 6 is a block diagram representation of an apparatus for producing a sampling clock pulse according to another embodiment of the present invention.

As is apparent from the above description, the frequency of the sampling clock pulse in the embodiments shown in FIGS. 2 and 5 is determined by the oscillating frequency of the oscillator 14. However, the oscillating frequency varies in response to a variation of a power source voltage, a variation of an environmental temperature, or a time aging of circuit parts. Another embodiment shown in FIG. 6 can overcome such variations and constantly produce a sampling clock pulse having a stable and fixed frequency. Referring to FIG. 6, the numeral 100' denotes another sampling clock pulse generator, and the same reference numerals are used to designate the same parts as those shown in FIG. 2. As the oscillator 14, a voltage controlled oscillator is utilized which may be the above mentioned IC (SN74S124N), because such IC has a voltage control input terminal (V), also. The numerals 50 to 59 denote an AND gate, a vertical synchronous signal separator, an M.M., a latch circuit, a crystal oscillator, a 1/n divider, a phase comparator, a gate circuit, a phase compensator and a 1/m divider, respectively.

Figure 7:
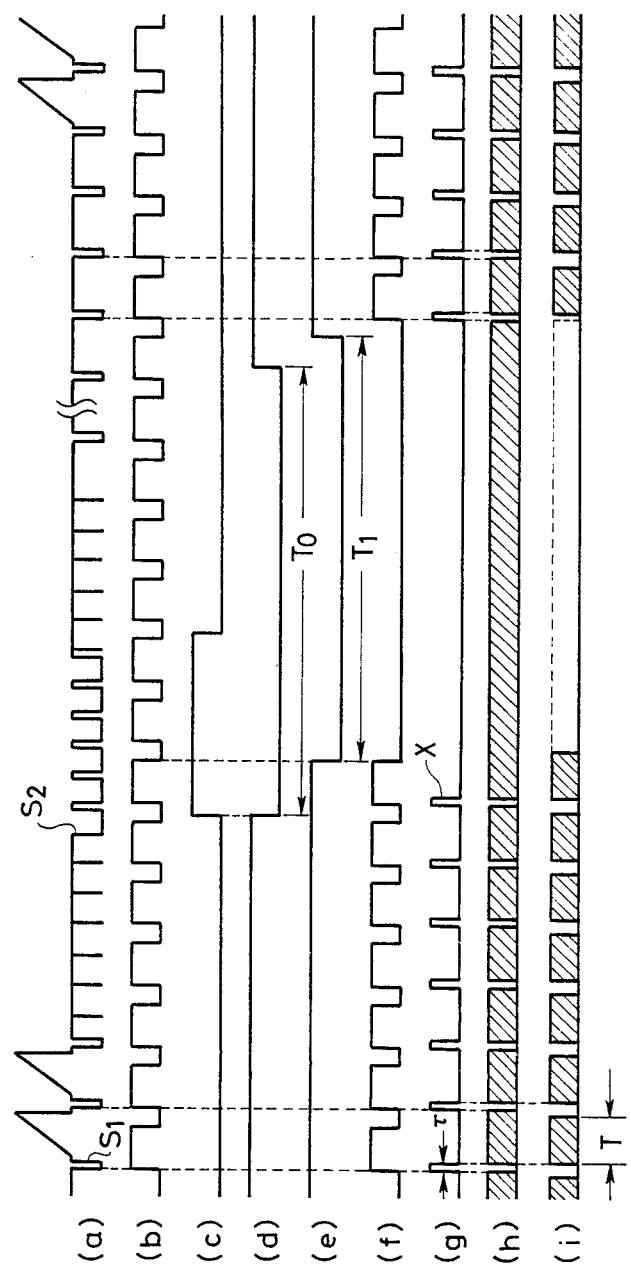
FIG. 7 illustrates waveforms of signals in accordance with FIG. 6.

FIG. 7 shows waveforms (a) to (i) related to the parts of the sampling clock pulse generator 100'. The waveform (a) depicts the video signal supplied to the input terminal 10, and $S_1$ and $S_2$ denote the synchronizing signal separated by the separator 11. The waveforms (b) and (c) show the horizontal synchronizing signal and a vertical synchronizing signal separated by the separators 12 and 51, respectively. The M.M. 52 is triggered by the vertical synchronizing signal and produces an output signal having a fixed pulse width $T_0$ corresponding to the vertical blanking period of the input video signal, which is shown in waveform (d). The output signal is supplied to the latch circuit 53 and synchronized with a trailing edge of the output signal of the separator 12. The latch circuit produces an output signal having a "L" state during a period $T_1$ from the trailing edge, as shown in the waveform (e). The output signal of the separator 12 is gated by the output signal of the latch circuit 3 by the AND gate 50. The M.M. 13 is triggered by an output signal of the AND gate 50, and produces start pulses shown as waveform (g). As a result, the start pulses are not produced during the period $T_1$ corresponding to the vertical blanking period.

The start pulses are supplied to the enable terminal E of the oscillator 14, and, as mentioned above, an oscillating output signal synchronized with the start pulses is produced from the oscillator 14. Parts having oblique lines within the waveform (h) show an oscillating period of the oscillator 14. As is apparent from the waveform (h), during the period $T_1$, the oscillator 14 continues the oscillation which is triggered by the start pulse indicated by X in the waveform (g).

According to this embodiment, the oscillator 14 is controlled by a phase locked loop circuit (hereinafter PLL circuit) during the period $T_1$, so that the oscillation thereof is stabilized. That is, by using the output signal of the crystal oscillator 54 as a reference signal having a stable frequency and constructing the PLL circuit with the circuit elements 55 to 59 and the oscillator 14, the output signal of the oscillator 14 is phase-synchronized with the reference signal.

The output signal of the crystal oscillator is divided by the 1/n divider 55, and the output signal of the 1/n divider 55 is supplied to one terminal of the phase comparator 56. The phase comparator 56 also receives an output signal of the 1/m divider 59 which divides the output signal of oscillator 14. The 1/m divider 59 is reset by the start pulse from the M.M. 13. The phase comparator 56 supplies a phase error signal corresponding to a phase difference of both divided signals. The gate circuit 57, which is controlled by the output signal of the latch circuit 53, passes the phase error signal during the period $T_1$. As a result, the phase error signal is supplied to the phase compensator 58 only duirng the period $T_1$, and the phase error signal is held by the phase compensator during a remaining period. The phase compensator 58 may be constructed, for example, by an integrator, etc. The phase error signal is sufficiently smoothed and compensated so as to stabilize the characteristic of the PLL circuit. The output signal of the phase compensator 58 is supplied to the voltage control input terminal (V) of the oscillator 14.

With the PLL type feedback control described above, the oscillating output signal of the oscillator 14 is phase synchronized with the stable reference signal generated from the crystal oscillator 54. An oscillating frequency $f_0$ thereof is shown by the following formula:

$$f_0 = m/n \cdot f_1 \qquad (1)$$

Here, $f_1$ is an oscillating frequency of the reference signal. The frequency $f_0$ is freely determined by the dividing values m and n, and the frequency $f_1$, and does not have any deviation from a set value. Further, since the frequency of the reference signal has a constant value, it is possible to reduce the phase distance between the reference signal, that is, to make the dividing value m near to 1, and the maximum value of the phase distance at the phase lock-in only one period of the oscillating output signal. Therefore, it is possible to obtain a sufficient response speed and almost no phase fluctuation occurs. Also, even if some phase fluctuation occurs, there is only a small amount. Further, as the phase of the oscillating output signal is instantaneously set to the synchronizing signal of the input video signal, the affect thereof is reduced sharply. The oscillating output signal of the oscillator 14 is supplied to the clock counter 15 and in the same manner as mentioned above. Therefore, a sampling clock pulse, for processing the input video signal every horizontal scanning line is obtained at the output terminal 20. Further, as shown in waveform (i) in FIG. 7, it is possible that the sampling clock pulse is not provided during the period $T_1$ in some cases.

In the aforementioned embodiments, the conventional horizontal and vertical synchronizing signals are used as the synchronizing signal. However, it is possible to apply this invention to other types of synchronizing signals, for example, horizontal synchronizing information allotted to every two horizontal scanning lines, which is used in a highly defined video signal, and two horizontal synchronizing information signals, one of which is for a luminance signal and another of which is for a chrominance signal, allotted to every horizontal scanning line, which is used in an 8 mm video camera, for example.

Figure 8:
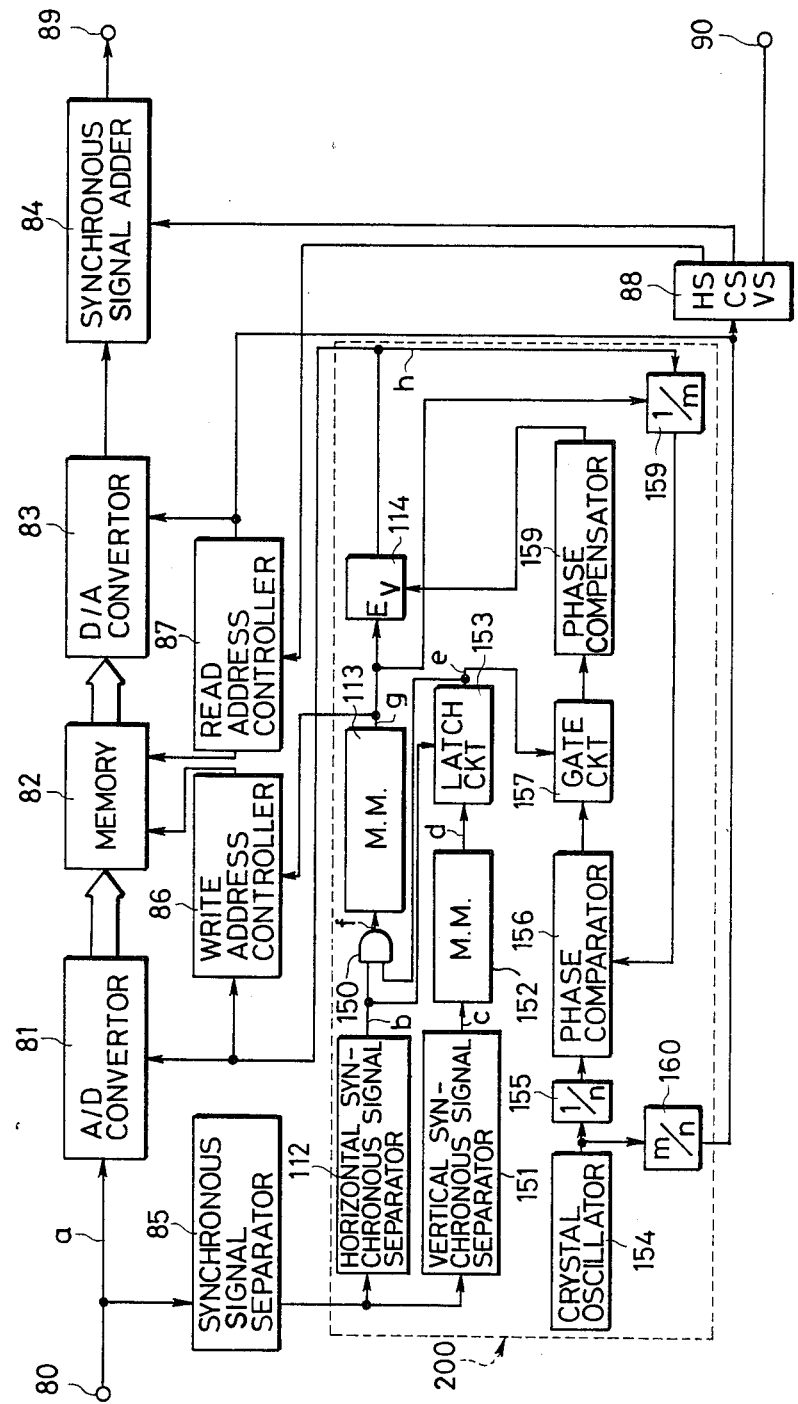
FIG. 8 is a block diagram representation of an apparatus for correcting time base fluctuation of a video signal according to an embodiment of the present invention.

Next, another embodiment of this invention, which is applied to an apparatus for correcting a time base fluctuation of the video signal, will be described. In an apparatus for recording/reproducing information on a magnetic tape such as a video recorder (hereinafter VTR), or an apparatus for reproducing information from an optical disc like a video disc player (hereinafter VDP), the reproduced video signal has time base fluctuations. This time base fluctuation causes jitter and skew in a reproduced picture. The embodiment illustrated in FIG. 8 enables removal of such fluctuations and numerals 80 and 89 denote an input terminal of the video signal having time base fluctuations and an output terminal of a corrected video signal, respectively. The numeral 81 denotes an A/D converter and the numeral 82 denotes a memory such as a RAM. A synchronous signal separator 85 separates a synchronizing signal from the input video signal and supplies the same to a write clock generator 200. The write clock generator 200 generates write clock pulses having a time base fluctuation coincident with one of the synchronizing signals. A write address controller 86 produces write addresses in response to the write clock pulses. Accordingly, the video signal having the time base fluctuation is converted to a sequential digital signal synchronized with the write clock pulses by the A/D converter 81, and the sequential digital signal is written in the memory 82 in response to the write addresses. The write clock generator 200 has construction similar to the sampling clock generator 100' shown in FIG. 6. Referring to the clock generator 200, the numerals 112 to 114 and 151 to 159 correspond to the numerals 12 to 14 and 51 to 59 shown in FIG. 6. The numeral 160 designates a m/n divider.

As described above, the oscillator 114 produces the write clock pulses having the frequency $f_0$ in accordance with the formula (1). Needless to say, the write clock pulses have the same characteristic as the sampling clock pulses according to the embodiment shown in FIG. 6. The write address controller 86 receives the start pulse produced by the M.M. 113 together with the write clock pulses. The write address controller 86, which is formed, for example, by a counter, etc., starts to count the write clock pulses by the start pulse which is generated every horizontal scanning period, and supplies a write address signal to the memory 82 in response to a counted number during the period T shown in the waveform (b) in FIG. 3. Further, this address signal is renewed by the start pulse one by one, so that the output signal of the A/D converter 81 is sequentially written in the memory 82.

Meanwhile, the reference signal produced by the crystal oscillator 154 is divided by the m/n divider 160, the output of which is supplied to a read address controller 87 and a D/A converter 83 as read clock pulses. A frequency $f_R$ of the read clock pulses is determined by the following formula:

$$f_R = m/n \cdot f_1 \quad (2)$$

From the formulas (1) and (2), the frequency $f_R$ of the read clock pulses may be set equal to the frequency $f_0$ of the write clock pulses.

A reference synchronizing signal generator 88 receives the read clock pulses, appropriately divides them and produces a reference synchronizing signal CS having the same format as the synchronizing signal of the input video signal; a start pulse HS having the same timing as the one start pulse shown in the waveform (c) in FIG. 3; and a reference vertical synchronizing signal VS. A read address controller 87, which is constructed, for example, by a counter, etc., starts to count the read clock pulses by the start pulse HS, and supplies a read address signal for the memory 82 in response to a counted number during the period T. The read address signal is renewed by the start pulse HS one by one, so that the stored video signal is sequentially read from the memory 82 and supplied to the D/A converter 83.

As is apparent from the above description, the output signal of the D/A converter 83 does not have a horizontal blanking signal and a synchronizing signal. Accordingly, a synchronous signal adder 84 adds the reference synchronizing signal CS to the output signal of the D/A converter. Further, the vertical synchronizing signal VS is supplied to the terminal 90, and is used as a reference signal for a servo circuit which is not shown in FIG. 8. Moreover, since the frequencies $f_0$ and $f_R$ are controlled by the PLL circuit to become the same, the time base fluctuation of the input video signal is eliminated. Further, the write clock pulses are instantaneously synchronized with the synchronizing signal of the input video signal if rapid time base fluctuations resulting in skew occur, and stable write clock pulses are produced which accurately follow any kind of time base fluctuation.

Figure 9:
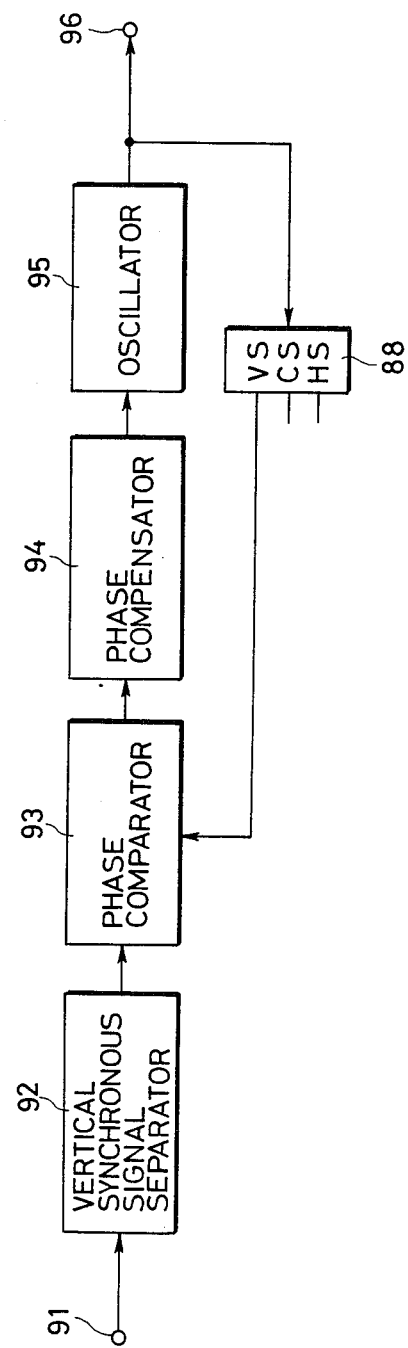
FIG. 9 is a block diagram representation of an apparatus for correcting the time base fluctuations using an external synchronizing signal according to another embodiment of the present invention.

In the aforementioned embodiment, the reference synchronous signal CS is produced by the generator 88. However, it is possible to use an automatic phase controller (hereinafter APC) as shown in FIG. 9, in order to synchronize the reference synchronizing signal with an external reference synchronizing signal. Referring to FIG. 9, the generator 88 generates the signals CS, VS and HS. An input terminal 91 receives the external reference synchronizing signal. A vertical synchronizing signal separator 92 separates the vertical synchronizing signal of the external reference synchronizing signal. This vertical synchronizing signal is phase-compared with the signal VS produced by the generator 88 by a phase comparator 93, which generates an error signal in response to a phase difference therebetween. The error signal is supplied through a phase compensator 94 to a control terminal of an oscillator 95. The oscillator 95 produces the reference signal having the oscillating frequency $f_1$.

As a result, the internal reference vertical synchronizing signal VS of the reference synchronous signal generator 88 is phase-locked into the external reference vertical synchronizing signal. Accordingly, as the oscillator 95 is used instead of the crystal oscillator 154 shown in FIG. 8, it becomes possible to synchronize the apparatus for correcting the time base fluctuation with the external reference vertical synchronizing signal.

In accordance with the present invention, it becomes possible to provide sampling clock pulses for sampling and processing the video signal without frequency deviation by instantaneously synchronizing the sampling clock pulse with the video signal. Accordingly, time base fluctuation due to quantization of the video signal is prevented and the picture quality deterioration, i.e., spurious interruption, can be minimized. Further, even if time base fluctuation occurs within the video signal, the present invention enables the stable production of sampling clock pulses which accurately following such fluctuations without frequency deviation and to eliminate time base fluctuation without figure distortion.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A method for sampling and processing a video signal containing synchronizing information on a time base, comprising the steps of:
   separating the synchronizing information from the video signal;
   producing sampling clock pulses in the form of an oscillating output signal of an oscillator by controlling the oscillation of the oscillating output signal of the oscillator in accordance with the separated synchronizing information;
   sampling the video signal on the time base with the produced sampling clock pulses;
   generating a reference signal having a predetermined frequency;
   detecting at least part of a vertical blanking period of the video signal; and
   phase comparing a first signal which is one of the oscillating output signal and the oscillating output signal divided by a predetermined amount with a second signal which is one of the reference signal and the reference signal divided by a predetermined amount and providing a phase error output signal indicative of the phase difference.

2. A method according to claim 1, wherein the first signal is the oscillating output signal, and the second signal is the reference signal.

3. A method according to claim 1, wherein the first signal is the divided oscillating output signal and the second signal is the divided reference signal.

4. A method according to claim 1, wherein the predetermined period is at least a part of a vertical blanking period derived from the video signal.

5. An apparatus for sampling and processing a video signal containing synchronizing information on a time base, comprising:
   separating means for separating the synchronizing information from the video signal and providing an output indicative thereof;
   oscillator means responsive to the output signal of the separating means for producing sampling clock pulses in the form of an oscillating output signal thereof, the oscillation output signal of the oscillator means being controlled in accordance with the output of the separating means so that the oscillating output signal is instantaneously phase-synchronized with the output of the separating means; and
   sampling means for sampling the video signal on the time base with the produced sampling clock pulses;
   wherein the oscillator means includes an oscillator having an enable input for initiating the oscillation output signal of the oscillator in response to the output of the separating means, and clock counter means responsive to the oscillation output signal of the oscillator and the output of the separating means for producing sampling clock pulses as an output thereof.

6. An apparatus for sampling and processing a video signal containing synchronizing information on a time base, comprising:
   separating means for separating the synchronizing information from the video signal and providing an output indicative thereof;
   oscillator means responsive to the output signal of the separating means for producing sampling clock pulses in the form of an oscillating output signal thereof, the oscillation output signal of the oscillator means being controlled in accordance with the output of the separating means so that the oscillating output signal is instantaneously phase-synchronized with the output of the separating means;
   sampling means for sampling the video signal on the time base with the produced sampling clock pulses;
   reference signal generating means for generating a reference signal having a predetermined frequency;
   detector means for detecting at least a part of a vertical blanking period of the video signal and providing an output signal indicative thereof; and
   phase comparison means for comparing a first signal which is one of the oscillating output signal of the oscillator means and the oscillating output signal divided by a predetermined amount with a second signal which is one of the reference signal of the reference signal generating means and the reference signal divided by a predetermined amount and providing a phase error signal indicative of the phase difference therebetween; and
   controlling means for controlling an oscillating frequency of the oscillator means in response to the phase error signal of the phase comparison means and the output signal of the detector means.

7. An apparatus according to claim 6, wherein the controlling means is responsive to the output signal of the detector means for controlling the oscillating frequency of the oscillator means during the detected vertical blanking period.

8. An apparatus according to claim 6, further comprising first divider means for dividing the oscillating output signal by the predetermined amount and second divider means for dividing the reference signal by the predetermined amount.

9. An apparatus for sampling and processing a video signal containing synchronizing information on a time base, comprising:
   separating means for separating the synchronizing information from the video signal and providing an output indicative thereof;
   oscillator means responsive to the output signal of the separating means for producing sampling clock pulses in the form of an oscillating output signal thereof, the oscillation output signal of the oscillator means being controlled in accordance with the output of the separating means so that the oscillating output signal is instantaneously phase-synchronized with the output of the separating means; and
   sampling means for sampling the video signal on the time base with the produced sampling clock pulses;
   the sampling means including A/D converter means for converting the video signal to a digitized video signal and providing an output indicative thereof, memory means for storing the output of the A/D converter means and for reading out a stored output, digital adder means for adding an output from the A/D converter means and the memory means and providing an output therefrom, and D/A converter means for converting the output of the digital adder means to an analog signal, the A/D converter means, the memory means and the D/A converter means being responsive to the produced sampling clock pulses for controlling the operation thereof.

10. An apparatus according to claim 9, further comprising synchronous signal adder means for adding the output of the D/A converter means and the output of the separating means and providing an output indicative thereof.

11. An apparatus for correcting a time base fluctuation of a video signal containing synchronizing information on a time base, the apparatus comprising:
- A/D converter means for converting the video signal to a digitized video signal and providing an output indicative thereof;
- memory means for storing the output of the A/D converter means and for reading out a stored output therefrom;
- write address controller means for controlling writing in the memory means;
- read address controller means for controlling reading of the memory means;
- D/A converter means for converting the stored output read from the memory means to an analog signal;
- separating means for separating the synchronizing information from the video signal and providing an output indicative thereof;
- oscillator means responsive to the output signal of the separating means for producing sampling clock pulses in the form of an oscillating output signal thereof, the oscillating output signal of the oscillator means being controlled in accordance with the output of the separating means so that the oscillating output signal is instantaneously phase-synchronized with the output of the separating means;
- reference signal generating means for generating a reference signal having a predetermined frequency;
- detector means for detecting at least a part of a vertical blanking period of the video signal and providing an output signal indicative thereof;
- phase comparison means for comparing a first signal which is one of the oscillating output signal of the oscillator means and the oscillating output signal divided by a predetermined amount with a second signal which is one of the reference signal of the reference signal generating means and the reference signal divided by a predetermined amount and providing a phase error signal indicative of the phase difference therebetween; and
- controlling means for controlling an oscillating frequency of the oscillator means in response to the phase error signal of the phase comparison means and the output signal of the detector means, the A/D converter means and the write address controller means being responsive to the sampling clock pulses for controlling the operation thereof, and the read address controller means and the D/A converter means being responsive to the second signal for controlling the operation thereof.

12. An apparatus according to claim 11 wherein the controlling means is responsive to the output signal of the detector means for controlling the oscillating frequency of the oscillator means during the detected vertical blanking period.

13. An apparatus according to claim 11, wherein the phase comparison means compares the divided oscillating output signal and the divided reference signal, and further comprising first divider means for dividing the oscillating output signal by the predetermined amount, and second divider means for dividing the reference signal by the predetermined amount.

14. An apparatus according to claim 11, further comprising synchronizing signal generator means for generating a synchronizing signal in response to the second signal, and adder means for adding the synchronizing signal of the synchronizing signal generator means and the output of the D/A converter means and providing an output indicative thereof.

15. An apparatus according to claim 14, wherein the reference signal generator means is responsive to an external signal for generating the reference signal in accordance therewith.

16. An apparatus according to claim 11, wherein the separating means includes first separator means for separating a horizontal synchronizing signal from the video signal and for providing an output signal indicative thereof to the oscillator means, and second separator means for separating a vertical synchronizing signal from the video signal and for providing an output signal indicative thereof to the detector means.

17. A method for sampling and processing a video signal containing synchronizing information on a time base, comprising the steps of:
- separating the synchronizing information from the video signal;
- producing sampling clock pulses in the form of an oscillating output signal of an oscillator by controlling the oscillation of the oscillating output signal of the oscillator in accordance with the separated synchronizing information;
- sampling the video signal on the time base with the produced sampling clock pulses,
- generating a reference signal having a predetermined frequency;
- phase comparing a first signal which is one of the oscillating output signal and the oscillating output signal divided by a predetermined amount with a second signal which is one of the reference signal and the reference signal divided by a predetermined amount and providing a phase error output signal indicative of the phase difference therebetween; and
- controlling an oscillating frequency of the oscillator in response to the phase error output signal during a predetermined period.

18. An apparatus for sampling and processing a video signal containing synchronizing information on a time base, comprising:
- separating means for separating the synchronizing information from the video signal and providing an output indicative thereof;
- oscillator means responsive to the output signal of the separating means for producing sampling clock pulses in the form of an oscillating output signal thereof, the oscillation output signal of the oscillating means being controlled in accordance with the output of the separating means so that the oscillating output signal is instantaneously phase-synchronized with the output of the separating means;
- sampling means for sampling the video signal on the time base with the produced sampling clock pulses,
- reference signal generating means for generating a reference signal having a predetermined frequency;
- phase comparison means for comparing a first signal which is one of the oscillating output signal of the oscillator means and the oscillating output signal divided by a predetermined amount with a second signal which is one of the reference signal of the reference signal generating means and the reference signal divided by a predetermined amount and providing a phase error signal indicative of the phase difference therebetween; and
- controlling means for controlling an oscillating frequency of the oscillator means in response to the phase error signal of the phase comparison means during a predetermined period.

19. An apparatus according to claim 18, wherein: the predetermined period is at least a part of vertical blanking period derived from the video signal.

20. An apparatus according to claim 18, further comprising first divider means for dividing the oscillating output signal by the predetermined amount, and second divider means for dividing the reference signal by the predetermined amount.

21. An apparatus for correcting a time base fluctuation of a video signal containing synchronizing information on a time base, the apparatus comprising:

A/D converter means for converting the video signal to a digitized video signal and providing an output indicative thereof;

memory means for storing the output of the A/D converter means and for reading out a stored output therefrom;

write address controller means for controlling writing in the memory means;

read address controller means for controlling reading of the memory means;

D/A converter means for converting the stored output read from the memory means to an analog signal;

separating means for separating the synchronizing information from the video signal and providing an output indicative thereof;

oscillator means responsive to the output signal of the separating means for producing sampling clock pulses in the form of an oscillating output signal thereof, the oscillating output signal of the oscillator means being controlled in accordance with the output of the separating means so that the oscillating output signal is instantaneously phase-synchronized with the output of the separating means;

reference signal generating means for generating a reference signal having a predetermined frequency;

phase comparison means for comparing a first signal which is one of the oscillating output signal of the oscillator means and the oscillating output signal divided by a predetermined amount with a second signal which is one of the reference signal of the reference signal generating means and the reference signal divided by a predetermined amount and providing a phase error signal indicative of the phase difference therebetween; and controlling means for controlling an oscillating frequency of the oscillator means in response to the phase error signal of the phase comparison means during a predetermined period, the A/D converter means and the write address controller means being responsive to the sampling clock pulses for controlling the operation thereof, and the read address control means and the D/A converter means being responsive to the signal for controlling the operation thereof.

22. An apparatus according to claim 21, wherein the predetermined period is at least a part of a vertical blanking period derived from the video signal.

23. An apparatus according to claim 21, wherein the phase comparison means compares the divided oscillating output signal and the divided reference signal, and further comprising first divider means for dividing the oscillating output signal by the predetermined amount, and second divider means for dividing the reference signal by the predetermined amount.

24. An apparatus according to claim 21, further comprising synchronizing signal generator means for generating a synchronizing signal in response to the second signal and adder means for adding the synchronizing signal of the synchronizing signal generator means and the output of the D/A converter means and providing an output indicative thereof.

25. An apparatus according to claim 24, wherein the reference signal generator means is responsive to an external signal for generating the reference signal in accordance therewith.

26. An apparatus according to claim 21, wherein the separating means includes first separator means for separating a horizontal synchronizing signal from the video signal and for providing an output signal indicative thereof to the oscillator means, and second separator means for separating a vertical synchronizing signal from the video signal and for providing an output signal indicative thereof to the detector means.

* * * * *